May 3, 1960 W. HARTMANN 2,935,388
MATERIAL TREATING APPARATUS
Filed June 26, 1957 7 Sheets-Sheet 1

INVENTOR.
WALDEMAR HARTMANN
BY
ATTORNEY

May 3, 1960 W. HARTMANN 2,935,388
MATERIAL TREATING APPARATUS
Filed June 26, 1957 7 Sheets-Sheet 2

INVENTOR.
WALDEMAR HARTMANN
BY
ATTORNEY

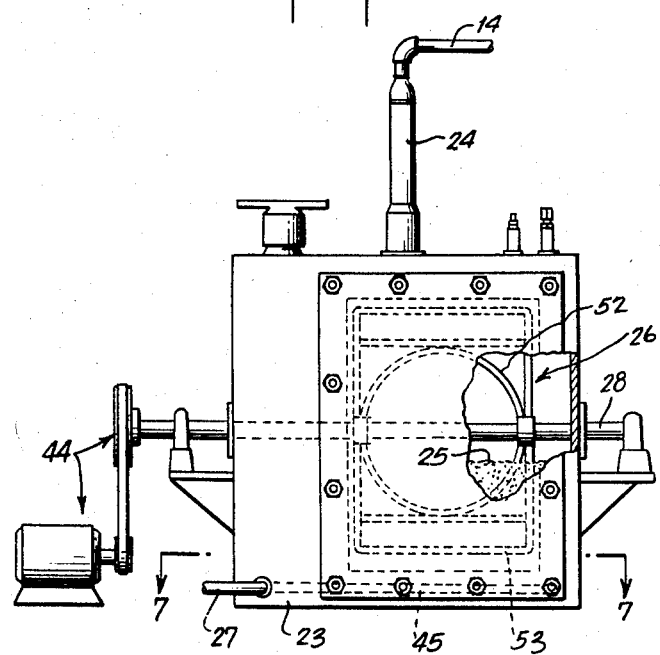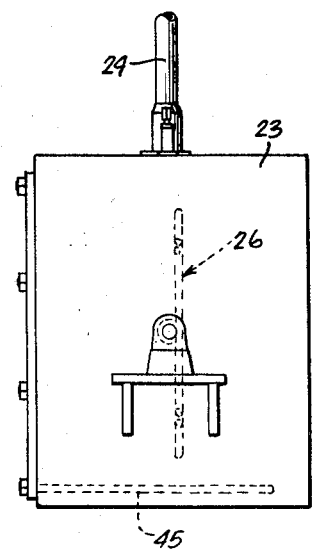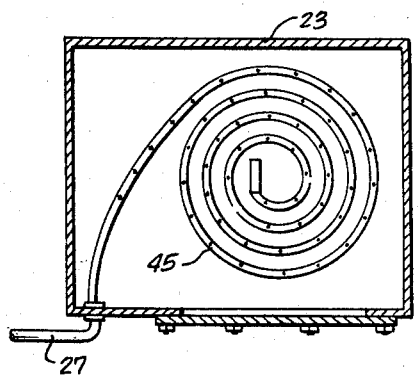

May 3, 1960     W. HARTMANN     2,935,388
MATERIAL TREATING APPARATUS
Filed June 26, 1957     7 Sheets-Sheet 4
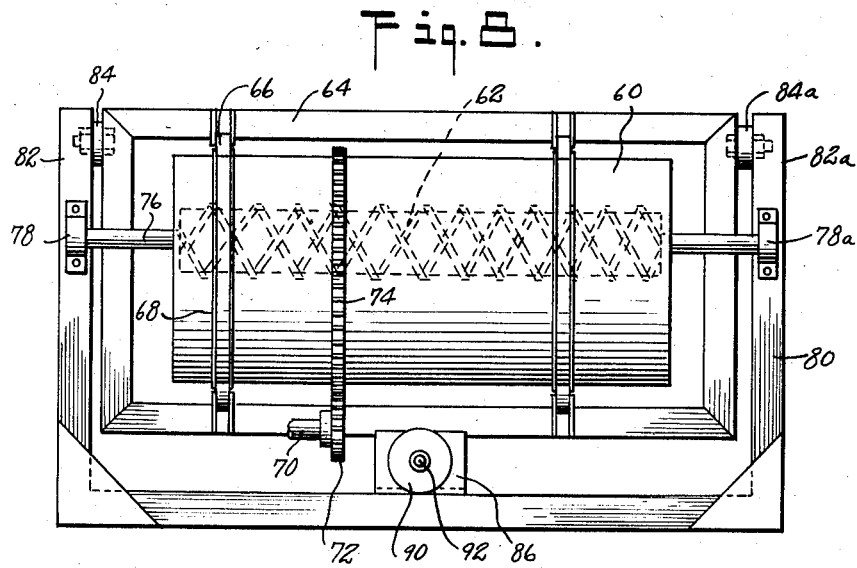
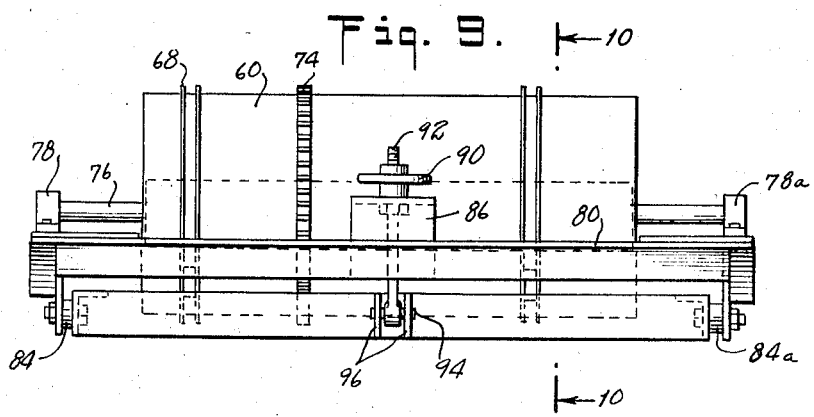
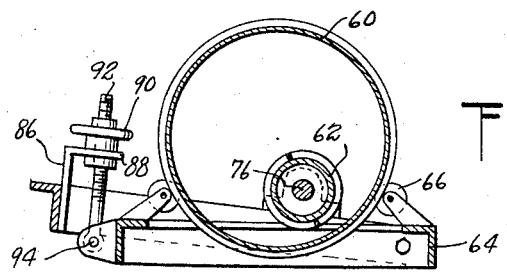
INVENTOR.
WALDEMAR HARTMANN
BY
ATTORNEY May 3, 1960 W. HARTMANN 2,935,388
MATERIAL TREATING APPARATUS
Filed June 26, 1957 7 Sheets-Sheet 5

INVENTOR.
WALDEMAR HARTMANN
BY
ATTORNEY

May 3, 1960 W. HARTMANN 2,935,388
MATERIAL TREATING APPARATUS
Filed June 26, 1957 7 Sheets-Sheet 6

INVENTOR.
WALDEMAR HARTMANN
BY
ATTORNEY

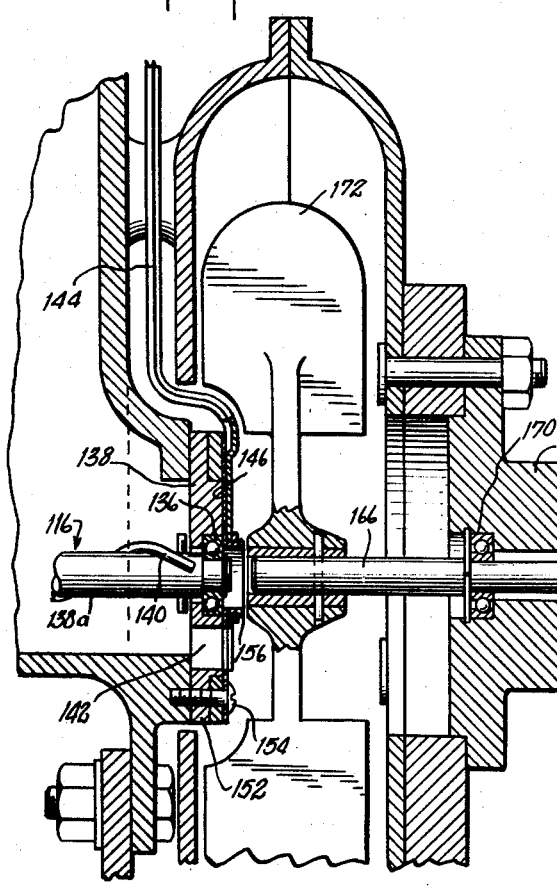
Fig. 13.
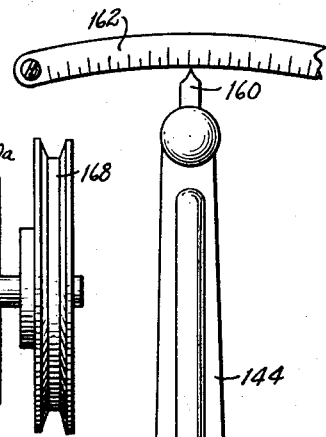
Fig. 14.
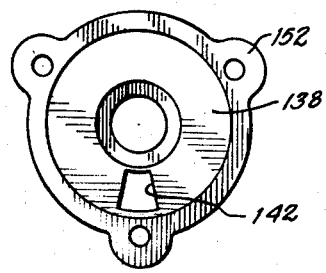
Fig. 15.
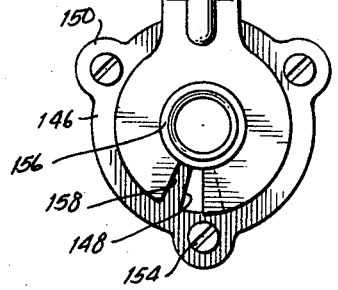
INVENTOR.
WALDEMAR HARTMANN
BY
ATTORNEY United States Patent Office 2,935,388
Patented May 3, 1960

2,935,388

MATERIAL TREATING APPARATUS

Waldemar Hartmann, Mountain Lakes, N.J., assignor, by direct and mesne assignments, to Hartmann Processing Co., a corporation of New Jersey Application June 26, 1957, Serial No. 668,180

5 Claims. (Cl. 44—2)

This invention relates to an apparatus for treating materials which are handled with great difficulty such as, for example, carbonaceous materials like coal silt to which reference is made herein by way of example only. This application is a continuation-in-part of my application Serial Number 587,408, filed May 25, 1956, now abandoned.

In the mining and subsequent cleaning of coal, a waste product is produced which is referred to herein as silt. Silt is made up of coal fines which are adhered together in a highly cohesive agglomeration. This silt is made up of fine particles which collect in the processing of coal and are finally removed from the coal breaker by sluicing on to a waste bank or are otherwise dumped and abandoned. This silt may be a product of either anthracite or the various bituminous coals and the apparatus of this invention applies equally to the treatment of coal silt from anthracite coal and bituminous coal. Anthracite coal particles which will pass through a screen having openings of 1/32 of an inch are known as anthracite silt. The anthracite silt contains particles in the following range of sizes:

+20-mesh particles which pass over a 20-mesh screen.
+40-mesh particles which pass over a 40-mesh screen
+80-mesh particles which pass over an 80-mesh screen
+100-mesh particles which pass over a 100-mesh screen
+150-mesh particles which pass over a 150-mesh screen
+200-mesh particles which pass over a 200-mesh screen
−200-mesh particles which pass through a 200-mesh screen In my Patent 2,778,718, dated January 22, 1957, I described a general method for the treatment of coal silt with a small percentage of spent sulphite in liquid or solid form to produce a comminutible product. This product is suitable for normal handling in normal powdered coal handling equipment. To treat the silt and to transform the cohesive agglomerated particles to friable particles, the spent sulphite is applied and the silt is worked in the device of this invention which provides a means and a detailed method of introducing the spent sulphite into the coal silt and working the coal silt.

It is an object of this invention to provide means for transforming agglomerated coal silt into friable pieces of coal silt which will not adhere to the sides of railroad cars, to transportation belts, shakers or pipes leading to ball mills and heaters.

It is another object of this invention to provide a means and method whereby spent sulphite is mixed with particles of coke or coal and the particles are transformed as a result into a substance which is more readily handled.

It is still another object of this invention to provide a means and method of modifying with spent sulphite the particles in coal silt and particles of coke or flue dust so that they are altered from their original condition and are more suitable for use.

It is a further object of this invention to provide a device for breaking up coal silt, introducing spent sulphite into the broken up coal silt, and working the sulphite and the broken up silt to modify the silt into a product which is friable.

These and other objects of this invention will become more apparent upon consideration of the following description taken together with the accompanying drawings in which:

Fig. 5 is a front elevation of a sulphite preparing device of this invention;

Fig. 6 is the slide elevation of the equipment shown in Fig. 5;

Fig. 7 is a horizontal section of the device of Fig. 5 taken on line 7—7 thereof;

Fig. 8 is a plan view of a modified form of the apparatus;

Fig. 9 is an elevational view of the apparatus of Fig. 8;

Fig. 10 is a sectional view taken on line 10—10 of Fig. 9;

Fig. 13 is a sectional view showing the principal parts of a powder metering device and related fan structure;

Fig. 14 is an enlarged detail view of a powder metering valve;

Fig. 15 is a detail of a metering valve component; and

Figure 16:
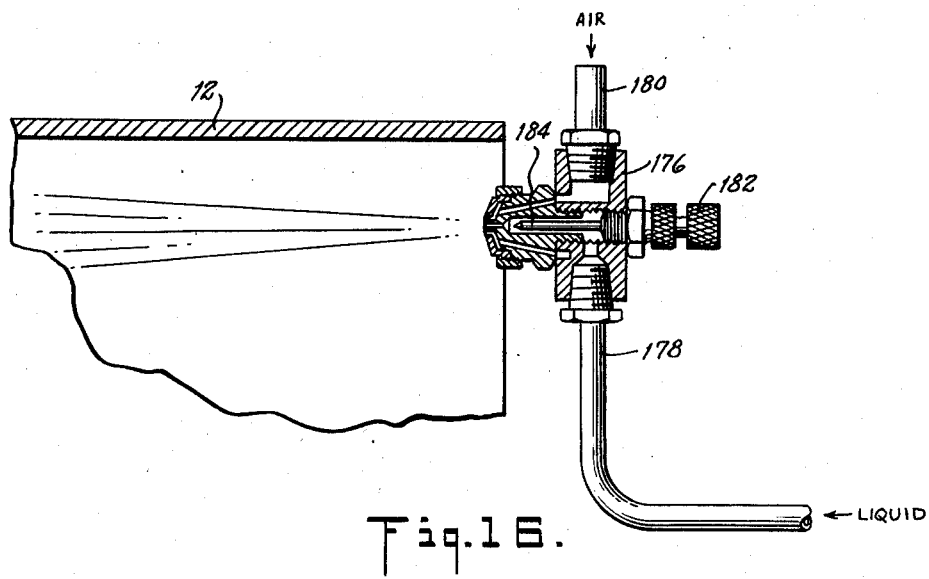

Fig. 16 discloses an atomizing nozzle for applying a liquid treating agent.

In general, the device of this invention provides means for transforming coal silt so that the tenacious particles making up the coal silt, including the particles having a size of less than 200-mesh, are broken up and mixed with spent sulphite such that the sulphite transforms the coal silt from an adhesive mass of cohesively agglomerated particles to friable pieces having particles which can be handled by normal procedures.

Figure 1:
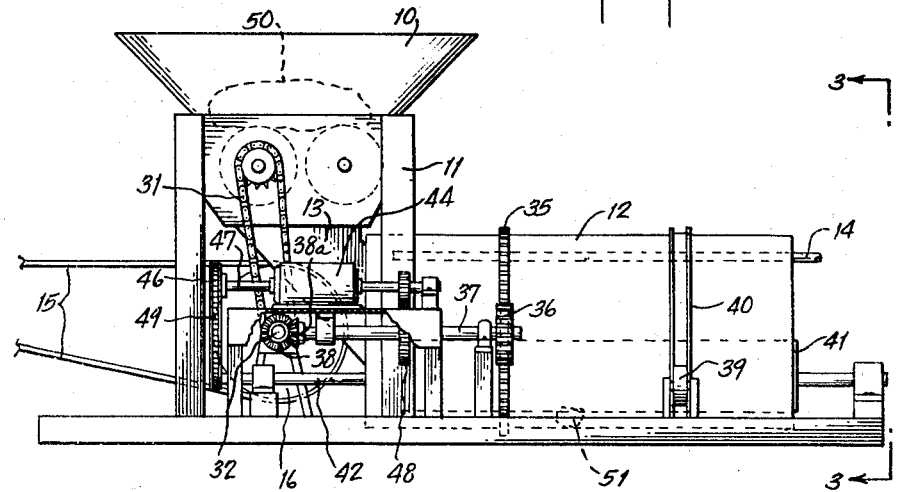
Fig. 1 is an elevation of apparatus for treating coal silt.
Figure 2:
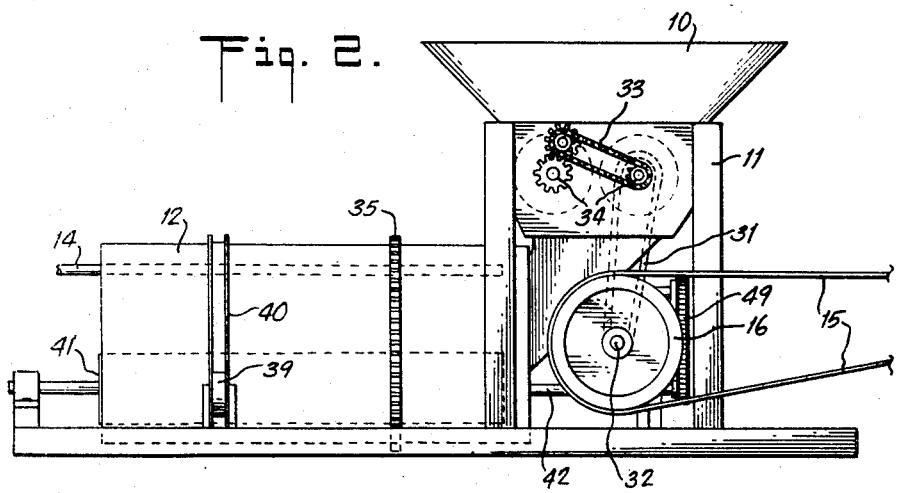
Fig. 2 is an elevation of the opposite side of the apparatus of Fig. 1.

Referring first to Fig. 1, an elevation of the treating apparatus of this invention shows a hopper 10 which is mounted on a stand 11. Lumps of silt 50 introduced and processed in the hopper 10 are reduced in size to pieces 51 (Fig. 4) and transported from the hopper 10 to a rotating barrel 12 from a chute 13. A sulphite application pipe 14 extends into the barrel 12 from the right and open end as shown in Fig. 1. As shown by the dotted lines, the application pipe 14 extends for nearly the full length of the barrel 12. In Fig. 2 the elevation of the opposite side of the apparatus shows a belt 15 and pulley 16 arrangement which drives the moving part of the apparatus.

*Supply tanks*

Figure 3:
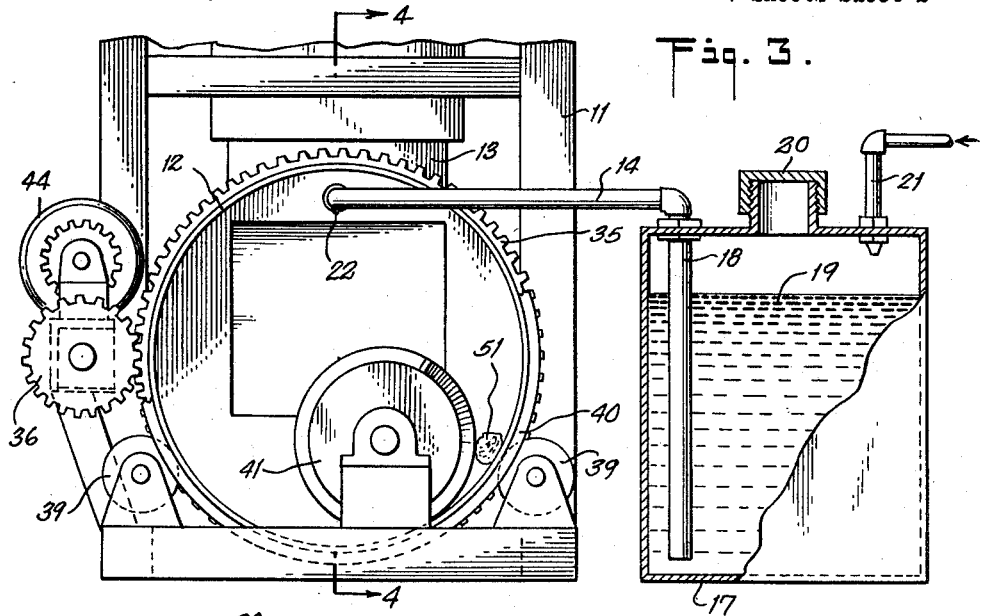
Fig. 3 is an elevation of the device of this invention taken on line 3—3 of Fig. 1.

In Fig. 3, the application pipe 14 is shown connected to a sulphite supply tank 17. A discharge tube 18 which extends to an inch from the bottom of the tank 17 is connected to the application pipe 14. The supply tank 17 dispenses a supply 19 of liquid spent sulphite to the barrel 12. The supply tank 17 has a fill plug 20 and an air pressure inlet conduit 21. Air is introduced into the supply tank 17 through the inlet conduit 21, creating a pressure on the liquid supply 19 which forces the liquid out of the discharge tube 18.

Suitable spent sulphite liquors for application to the coal silt are disclosed and described in my above-mentioned patent.

The application pipe 14 is shown extending axially of the barrel 12 to a point adjacent to the chute 13. Application pipe 14 is provided with jets 22 through which the spent sulphite liquid is applied to the reduced size pieces 51 of the silt in the barrel 12. The application of liquid spent sulphite to the treated coal silt is controllable in accordance with a mode of operation described in greater detail below.

Powdered spent sulphite may also be applied to the reduced pieces of silt. For the application of powdered spent sulphite, the supply tank 17 is replaced by a supply tank 23 of Figs. 5-7 or the dispensing mechanism of Figs. 11 and 12. The supply tank 23 has a discharge tube 24 attachable to the application pipe 14. The supply tank 23 contains a supply 25 of powdered spent sulphite. The powdered spent sulphite 25 is dispensed to the reduced size pieces 51 of silt in the barrel 12 through the application pipe 14 by means of an air stream which is introduced into the tank 23 under pressure through an air pressure conduit 27. The powder is airborne in the air pressure stream through the discharge tube 24 and the application pipe 14. The tank 23 contains a beater 26 which is rotatable on an axle 28 by suitable means 44 as shown in Fig. 5. The beater 26 consists of two parts, an inner circular ring 52 and an outside rectangular wire device 53. The outside rectangular wire device 53 assists in overcoming the tendency of the powder to pack and thus aids in keeping the powder in suspension for transfer to the barrel 12 by sweeping close to a perforated coil 45. The perforated coil 45 is formed within the tank 23 in convolute windings and is connected to the air pressure conduit 27. The perforations introduce and distribute the air throughout the tank. At the point of introduction of the air supply conduit 27 into the tank 23, it is welded to the tank and the inner end of the coil 45 is closed.

The beater 26 rotated on its axle 28 acts as an agitator for the spent sulphite powder in the tank 23 and maintains the powder suspended in the current of air introduced through the air pressure conduit 27. Suitable spent sulphite powders for application to the reduced size pieces 51 are set forth in my above-mentioned patent. The supply 25 of suspended spent sulphite powder is drawn off from the tank 23 through the discharge tube 24 and into the application pipe 14. The beater 26 in its agitation maintains spent sulphite powder airborne in proper density for application through the application pipe 14.

*Break up rolls*

Figure 4:
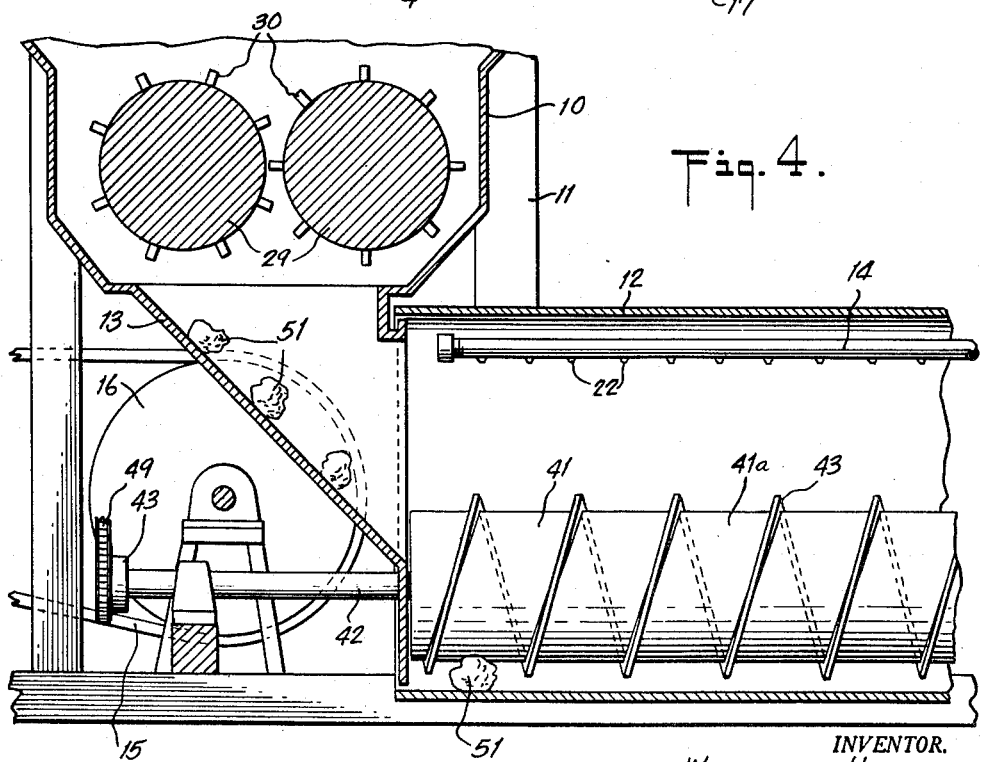
Fig. 4 is an axial section taken on line 4—4 of Fig. 3 and showing in detail some of the components of the apparatus of this invention in the direction of the arrows.

Referring again to the hopper 10 shown in Fig. 4, a pair of rolls 29 rotatable on parallel axes are positioned within the hopper 10 above the chute 13. Each of the rolls is provided with a number of pins 30 which are positioned so as to intermesh upon rotation of the rolls. In one embodiment of this invention, the rolls are eight inches in diameter and twelve inches in axial length. The pins 30 are 5/16 of an inch in thickness and 1½ inches long. The pins 30 are spaced one inch apart and are welded around each roll.

*Drives*

The rolls 29 are rotated at a rotational speed of about 600 r.p.m. The rolls 29 are driven from the pulley 16 through a link belt 31 and as a shaft 32 turned by the pulley to drive the belt 31 by a suitable gear sprocket. The link belt 31 drives one of the rolls 29 as shown in Fig. 1. As seen in Fig. 2, the other roll 29 is driven by a link belt 33 and a set of sprockets 34. The drives are operated at variable speeds. The speed of operation is dictated by the percentage of moisture in the material.

As shown in Fig. 1, the shaft 32 carries a bevel gear 38 which meshes with and drives a bevel gear 38a on a shaft 37. The shaft 37 carries a pinion gear 36 and a spur gear 48. The barrel 12 is driven through a ring gear 35 by the pinion gear 36. Bearings 39 support a flanged track 40 as shown in Figs. 1, 2 and 3 and prevent lengthwise shifting of the barrel 12. The barrel 12 contains a silt worker 41 which is rotated in the same direction as the barrel 12. The silt worker 41 is rotated at a considerably greater speed than the barrel 12. The silt worker 41 is driven through a shaft 42 shown in Fig. 4 carrying on its end a sprocket 43 which is driven from the shaft 47 through a gear box 44 and a link belt 49. The gear transmission box 44 drives gear 46 through a shaft 47 and is driven by the gear 48. Thus the means are provided for driving the silt worker 41 from the same prime mover that rotates the barrel but at a greater rotational rate. It is obvious, of course, that separate drive means may be employed. The gear box 44 permits selection of rotational speeds for the silt worker 41.

*Converter*

The barrel 12 is horizontally positioned or may be slightly inclined with the discharge end lowered to assist in the travel of the treated material. The silt worker 41 positioned in the barrel 12 has a diameter ⅓ of the diameter of the barrel 12. As shown in Fig. 3, and mentioned above, the silt worker 41 is positioned off center of the barrel 12. The silt worker 41 is made up of a tube 41a carrying a helically pitched strip 43 winding around the tube 41a. The strip 43 provides advancing action to the silt when the silt worker 41 is rotated as described above. The silt worker 41 may be positioned either left or right of the center of the barrel. When it is positioned right of center the rotation of the cylinder and the silt worker 41 must be counterclockwise. When the silt worker 41 is off center to the left in the barrel 12, the barrel 12 and the silt worker 41 must revolve in a clockwise rotation.

The relative rotation of the barrel and the silt worker must always be such that the confronting surfaces thereof move in an upward direction. The indicated relative rotation of barrel and silt worker, and at differential speeds, causes the material under treatment between the inner face of the barrel and the confronting face of the silt worker to be thrown upwardly with such force that a substantial portion of the material under treatment is in suspension at all stages of the treating operation. This greatly facilitates contact between the treating agent and the material being treated.

The treating material of spent sulphite is applied to the material in the barrel 12 while the reduced size pieces are being worked by the silt worker 41. The turning of the silt worker 41 in the material simultaneously rolls, cuts, and advances the material and the spent sulphite is worked into the material while this action is taking place. In this way, the spent sulphite is mixed into the reduced size pieces 51 of silt which are processed in the barrel 12.

*Operation*

In the operation of the apparatus shown in Figs. 1 through 7, a material such as waste silt from coal mining operations is fed into the hopper 10 by a suitable means. This silt is in the form of agglomerated fine particles of coal including particles of minus 200-mesh. The particles are cohered together by an extremely tenacious adhesion and this silt contains a substantial amount of water. The rolls 29 carrying the pins 30 work upon this material which is fed into the hopper in lumps 50 which are small enough to fit into the hopper. The rolls 29 and the intermeshing pins on the rolls break up the untreated silt but do not mash it. The pins 30 are mounted on the rolls 29 and spaced apart in such a manner as to provide clearance between adjacent rows on the opposing roller 29 and clearance between the pins 30 and the body of the opposing roller 29. Thus the rotating rolls 29 and the intermeshing pins 30 act upon the untreated silt without squeezing the material. The lumps 50 are thus broken into smaller pieces 51 without being crushed or compressed. The reduced size pieces 51 of silt drop into the chute 13 from the hopper 10 and are thus fed into the barrel 12.

The treating material which is preferably a spent sulphite product in accordance with the disclosure in my above-mentioned patent is dispensed for application to the reduced size pieces 51 of silt material from a supply tank as shown in Figs. 3, 5–7, 11 and 12. The treating material is applied to the reduced size pieces 51 in comparatively small increments, to provide efficiency and economy in the operation and also to assure adequate mixing of the treating material and the material to be treated. The application pipe 14 through which the treating material or spent sulphite is applied to the material to be treated, extends into the barrel 12, adjacent to its wall and is positioned in an extreme upper sector of the barrel 12 as shown in Figs. 3 and 4. From this superior position, the spent sulphite treating material settles on the reduced size silt pieces 51 and is mixed into the same by the action of the silt worker 41. The spent sulphite material is applied to the material under treatment substantially throughout the length of the barrel 12. The applicaion pipe 14 has suitable means such as jets 22 for distributing the application of the spent sulphite to the treated material. The spent sulphite material is preferably applied to the material under treatment by a spray action that applies small increments under easy control. The spent sulphite treating material may be applied to the silt material either in a powdered state or in a liquid state. When it is applied in a powdered state, the spent sulphite is airborne into the barrel 12 on an air stream produced in the supply tank 23 as described above, or by the delivery fan of Figs. 11 and 12, to be described presently. The liquid spent sulphite is sprayed from the application pipe 14 under air pressure which produces an atomizing action, or from the atomizing nozzle of Fig. 16, described below.

The reduced size pieces 51 of treated silt material are received in the barrel 12 from the chute 13 and are continuously subjected to the tumbling, rolling and cutting action of the silt worker 41 while the spent sulphite material is being applied. The spent sulphite is applied in increments as described above which are adjusted to the action of the silt worker 41 on the reduced size pieces 51 to bring about an optimum action of the treating material on the material under treatment. Simultaneously, the treated material is advanced along the barrel 12 by the strip 43 and is subjected to the further application of spent sulphite and further tumbling and cutting with the strip 43. When the treated material reaches the discharge end of the barrel 12, the cohesion of the particles has been modified to such a degree that the resultant pieces of silt material are friable, fall apart and become relatively comminutible.

In Figs. 8 through 10 is disclosed a rotary processing barrel 60 which has associated therewith a silt worker 62 which is mounted on an adjustable support such that the position of the silt worker 62 can be adjusted more readily for the proper control of pellet sizes in the treated product. In the modified treating apparatus of Figs. 8 through 10, the barrel 60 is mounted in a supporting frame 64 by means of rollers 66 which are engaged by circumferential tracks 68 fixed to the exterior of the barrel. Power for rotating the barrel 60 is applied to a shaft 70 and is transmitted through intermeshing gears 72 and 74. In these aspects, the modified treating barrel corresponds to the barrel disclosed in Figs. 1 and 2.

Whereas the silt worker 41 of Figs. 1 and 2 is adjustable in relation to the inner face of the barrel by the addition or subtraction of shims on which the end bearings for the shaft 42 are supported, or by laterally shifting the bearing supports, the modified form of apparatus provides an easy screw adjustment for adjusting the position of the silt worker 62. Accordingly, shaft 76 of the silt worker 62 is mounted in bearings 78 and 78a which are fixed to a generally U-shaped frame 80. The legs 82—82a of the U-shaped frame 80 are pivoted on the barrel frame 64 such that the entire frame 80 may be rocked about its pivotal connection with the barrel frame and thereby alter the position of the silt worker 62 within the barrel. The legs 82 and 82a of the frame 80 are connected to the barrel frame 64 by means of pivot structures 84 and 84a, respectively.

The frame 80 has attached thereto an upstanding bracket 86 which provides an inturned flange 88 in which is supported an adjusting nut 90. A threaded bolt 92 extends through the adjusting nut 90 and the lower end of the bolt 92 is attached to the barrel frame 64 by means of a pivot pin 94 which extends through a pair of ears 96 extending laterally from the underlying portion of the barrel frame 64. Thus, by rotating the adjusting nut 90, the U-shaped frame 80 can be raised or lowered with the consequence that the silt worker 62 is infinitely adjustable within the barrel 60.

The method for treating carbonaceous materials described in my aforesaid patent, contemplates the use of controlled amounts of spent sulphite either in liquid or powdered form.

The amount of treating agent must be varied from time to time in accordance with the amount of moisture in the silt and the rate at which the silt is being fed to the treating barrel. The modified form of treating powder handling mechanism disclosed in Figs. 11 through 15 is designed to provide precise control over the application of a powdered treating agent to the silt within the barrel. The treating agent in powdered form is placed into a closed hopper 98 from which it is metered into a delivery fan 100. The delivery fan 100 is adapted to discharge an air suspension of the treating powder into the treating barrel. The delivery fan may be located to discharge the treating powder into either end of the barrel or at any intermediate point therein by attaching a delivery tube of suitable length to the fan outlet 102.

Since the spent sulphite in powdered form is extremely sensitive to atmospheric moisture, it is important that the same be kept dry and in flowable condition within the hopper. Accordingly, an electric heating coil 104 is located within the hopper 98 and by means of a thermostat 106 attached thereto, the coil 104 is maintained at a temperature in excess of 90° F. A control wire 108 connects the thermostat 106 to a suitable thermostatic control device at the exterior of the hopper.

To further condition the powdered treating material, it is kept in constant agitation by a beater 110 within the hopper 98.

Figure 11:
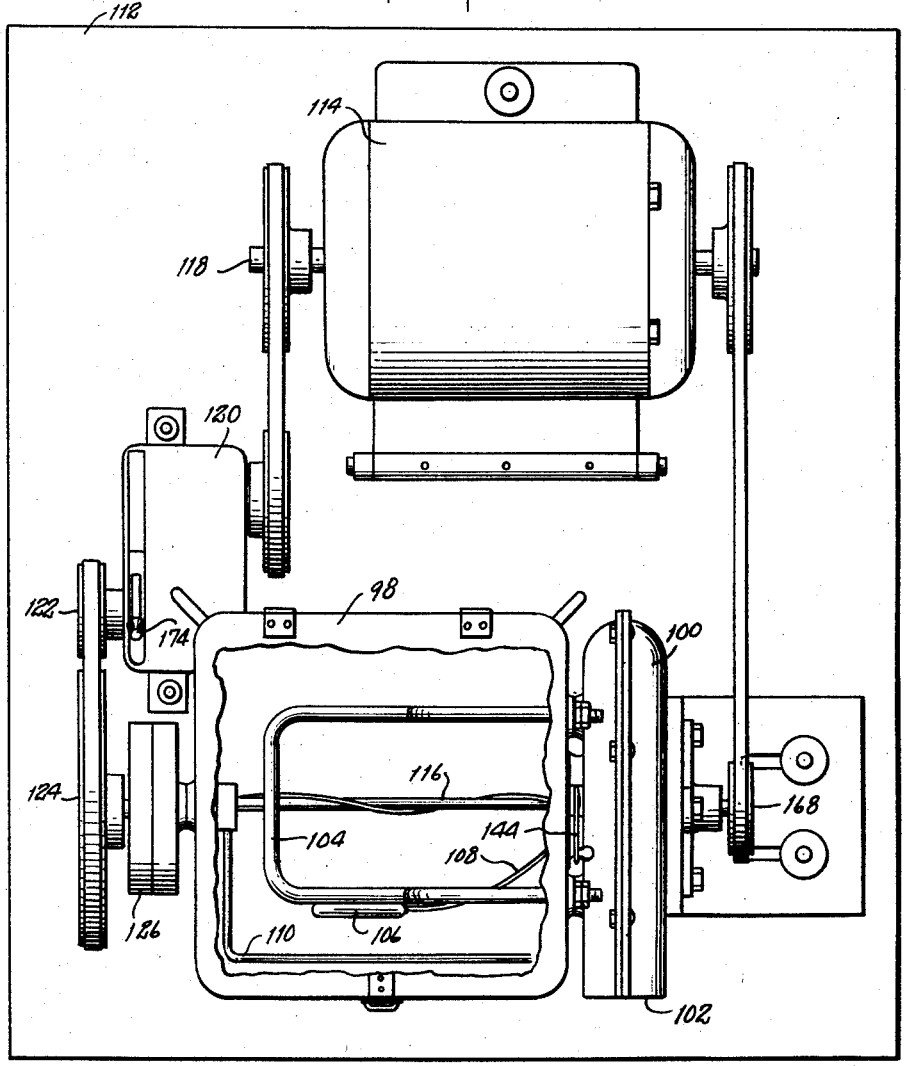
Fig. 11 is a plan view of modified apparatus for metering and applying powdered treating material, parts being broken away to show internal structure.

Fig. 11 shows the dispensing unit mounted on a base plate 112 and shows that the unit comprises not only the hopper 98 and the delivery fan 100 but also an electric motor 114 which is utilized to rotate the beater 110 and a powder delivery worm 116 in the hopper, and also the delivery fan 100. Power is transmitted from one end of the motor shaft 118 to a speed reducing unit 120. Power from the output shaft 122 of the speed reducing unit 120 is transmitted to a drive wheel 124 of a transmission gear unit 126 associated with the hopper 98. The drive wheel 124 is attached to a drive shaft 128 (Fig. 12) which extends through the transmission gear unit 126 to provide driving power for the beater 110. Within the transmission gear unit 126, the drive shaft 128 has affixed thereto a gear 130 (Fig. 12) which gear is in contact with an idler gear 132 and the latter in turn drives a pinion 134 on the end of the powder delivery worm 116.

The powder delivery worm 116 extends across the bottom of the hopper 98, its remote end being mounted in roller bearings 136 (Fig. 13) supported in a metering valve plate 138 which is fixed to the hopper housing. The delivery worm 116 comprises a shaft 138a which has a wire 140 helically wound thereabout and attached thereto. The metering valve plate 138 has a discharge aperture 142 formed therein at a point immediately below the shaft bearing 136 such that the helix 140 delivers powdered treating material to the discharge aperture 142.

The effective size of the discharge aperture 142 can be regulated by a manual control lever 144. The control lever is shown in Fig. 14 as comprising an enlarged portion surrounding its lower end which is shaped as hereinafter set out. Beneath this enlarged portion and secured to the valve plate 138 is a plate 146 which is provided with lugs 150 (Fig. 14); and these lugs are in turn secured to aligned lugs 152 (Fig. 15) formed on the outside of the plate 138, screws 154 extending through these aligned lugs and also through a portion of the hopper 49 so that all the parts are thereby held together as shown in Figs. 13–15. The plate 146 has an aperture 148 therein aligned with the discharge aperture 142. The lower enlarged end of control lever 144 is held in place on the plate 146 by providing the latter with a centrally located upstanding flange 156 which is peened slightly over to retain the lever 144 in operative relation as shown in Figs. 13 and 14. The enlarged end of the control lever 144 has a notch 158 formed therein which can be moved to an adjusted degree into and out of registry with the aligned discharge openings 142 and 148. Thus, rotation of the lever 144 about the bearing flange 156 will result in closing or opening the discharge aperture through which powder is transmitted from the inside of the hopper 98 into the casing of the fan 100 and will accurately control the rate at which powder is supplied. At its free end, the lever 144 has a pointer 160 which cooperates with a scale 162 such that the size of the opening between the hopper 98 and the delivery fan 100 is visually indicated.

The casing of the fan 100 is suitably attached to the outer face of the hopper 98 and provides a bearing block 164 for an impeller shaft 166 which is driven by a drive wheel 168 and a belt connection to the opposite end of the motor shaft 118. The bearing block 164 has a pair of axially spaced anti-friction bearings 170 and 170a which support the impeller shaft 166. The free end of the impeller shaft 166, which extends into the casing of the delivery fan 100, has an impeller 172 fixed thereto. As a consequence of this arrangement, powdered treating material can be metered from the hopper 98 into the delivery fan 100 and discharged from the fan outlet 102 into the material under treatment in the barrel.

The amount of treating material that is applied to material under treatment in the barrel must be varied as the moisture content of the raw material varies and also as the rate at which the material is fed into the barrel varies. The rate at which the treating material is metered into the delivery fan is determined not only by the size of the metering aperture, but also by the rate at which the shaft 138a within the hopper 98 is rotated, both the metering opening and the speed of shaft rotation being adjustable. The speed reducing unit 120 is of conventional structure and has a control lever 174 by which six speed changes can be obtained. In the instant apparatus, the motor shaft 118 rotates at 1750 r.p.m. This speed can be reduced in the speed reducing unit 120 to 30, 68, 112, 117, 240 or 353 r.p.m., depending on the position of the control lever 174. The gear ratios within the transmission gear unit 126 are such that these outputs of the speed reducing unit 120 transmit to the delivery worm 116, speeds of 220, 500, 828, 1265, 1753 and 2647 r.p.m., respectively. It is, therefore, possible to correlate the size of the metering opening and the speed of the delivery worm 116 such that the treating powder is delivered to the delivery fan at a predetermined rate. For example, the treating powder identified by the trade name Marabond, in my aforesaid patent, can be delivered from the hopper at a selected rate within the range of ¼ oz. to 1½ ozs. per minute when the delivery worm 116 is driven at 220 r.p.m., the selected rate depending, of course, on the setting of the control lever 144; within a range of ¼ oz. to 1¾ ozs. when the delivery worm is driven at 500 r.p.m.; within a range of ¼ oz. to 2¼ ozs. when the delivery worm is driven at 828 r.p.m.; within a range of ¼ oz. to 2½ ozs. when the delivery worm is driven at 1265 r.p.m.; within a range of ¼ oz. to 5 ozs. when the delivery worm is driven at 1753 r.p.m.; and within a range of ¼ oz. to 11 ozs. when the delivery worm is driven at 2647 r.p.m. The rate of feed at any delivery worm speed is, of course, varied by changing the metering opening through rotation of the lever 144. The rate of feed of all of the treating powders at any delivery worm speed and for any selected size of metering opening is so constant that tables can be compiled to show the rate of feed produced at any selected delivery worm speed and metering opening.

In lieu of the mechanism for delivering liquid treating agent to the barrel, disclosed in Fig. 3, it may be advantageous to employ an atomizing nozzle such as that shown in Fig. 16. An atomizing nozzle provides adequate control of the rate at which the liquid treating agent is delivered to the material under treatment and it also provides a good suspension of the liquid treating agent in the atmosphere surrounding the material being treated, thus assuring a maximum amount of contact between the treating agent and the material.

In Fig. 16, the drum 12 has extending into one end thereof an atomizing nozzle 176 which is of conventional structure. The treating liquid enters the nozzle by way of a conduit 178 and air under pressure is fed to the nozzle from a suitable source by way of a conduit 180. The air and the treating liquid are mixed in the nozzle and the liquid is forced from the nozzle together with the air stream in which it is suspended in finely divided form. The amount of liquid being discharged from the nozzle can be regulated by manipulating a thumb screw 182 to project or retract a control needle 184 which constitutes an element of a conventional needle valve arrangement.

Figure 12:
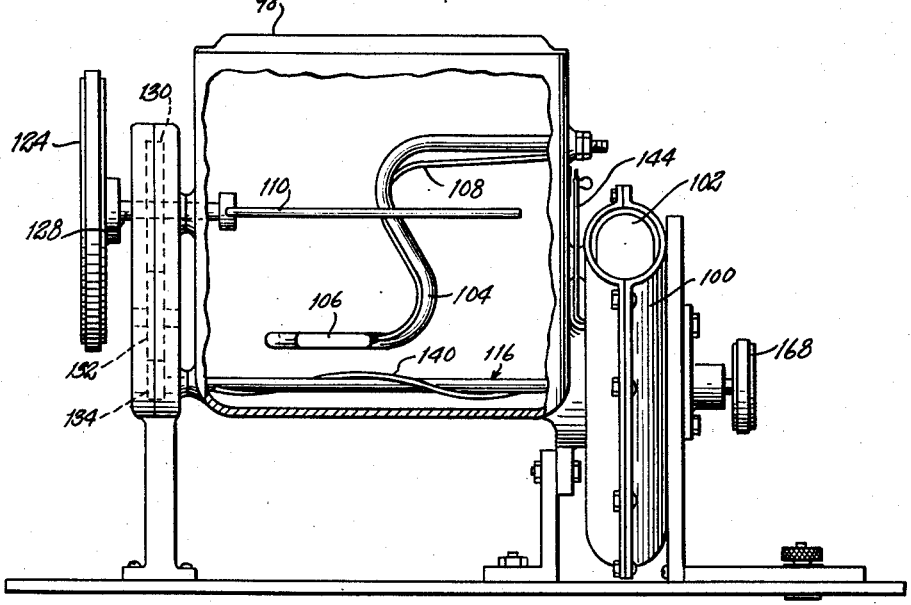
Fig. 12 is an elevational view of part of the apparatus shown in Fig. 11.

The advantages of using a thermostatically controlled heating coil, such as above described, can be realized also by inserting a heating coil such as the coil 104 of Fig. 12 into the powder dispensing chamber 23 of Figs. 5 through 7. By the same token, liquid treating agents of the kind disclosed in my aforesaid patent, can be applied to the material under treatment with a greater degree of control if the viscosity thereof is kept constant. Accordingly, it is contemplated that a thermostatically controlled heating coil, such as the coil 104 of Fig. 12, be utilized also in connection with the liquid treating agent system of Fig. 3. A heating coil within the liquid container should maintain the liquid at about 130° F. Most liquid treating agents have improved characteristics in connection with the material under treatment if kept at this temperature.

The barrel and worker of this invention can also be used for treating coke and flue dust. Coke dust or quencher dust is a dark silver-grayish material which is produced during the preparation of coke. When coke is taken from the coke ovens in burning condition and is quenched, a very fine quencher dust is produced and this dust accumulates. It has been found that this type of dust and flue dust can be made manageable by treatment in the barrel of this invention with certain additional modifications. The dust is heated from 175° F. to 200° F. At the same time, spent sulphite liquor is heated to the same temperature and applied to the heated dust. The mixture is worked through the turning barrel of this invention by the worker of this invention to produce a soft, flexible material. The soft, flexible material may then be put through a pelletizing machine and cut to a proper size without clogging the pelletizing machine or forming a stiff mass.

A current of heated air is blown into the discharge end of the barrel to heat the coke dust or flue dust to the necessary temperature. The spent sulphite is heated by any suitable means before application to the dust.

The material produced by working the heated dust and sulphite results in a composition which will not clog when pelletized. No baking is necessary in the pelletizing operation. Pellets of variable size and discrete and permanent shape are produced. The material is produced in suspension. The apparatus has been successful in treating dust having particles as small as —400-mesh. The following example is illustrative of the process of treating coke dust.

*Example*

Coke dust of a sizing of a full 100% —200-mesh with an ash content of 2.8% and a moisture content of 5% was heated to about 170° F. in a tank. Spent sulphite liquor was heated to about 170° F. The coke dust was blown into a converter barrel. The heated spent sulphite liquor was sprayed on the coke dust. The material was heated by a hot air stream blown into the converter. The converter was a barrel rotatable on its axis and containing stirring means such as a helix. Due to the rotation of the barrel and the helix, the material was kept in suspension as it passed along the length of the barrel such that the suspended and heated material was thoroughly mixed with the heated spent sulphite liquor. The treated material discharged from the end of the barrel was dropped into a pelletizing machine which formed it into pellets of ⅛ of an inch to ¼ of an inch in length. Upon completion, the pellets contained less than 15% moisture and had sufficient strength to withstand normal handling in conveying machinery such as chutes and bucket elevators.

As a further modification of this invention, the reduced size pieces of coal silt may be heated while being worked. It has been found that this produces a satisfactory product.

One manner of heating reduced size pieces of silt in the barrel is by a stream of hot air applied to the reduced size pieces. A blast of air can be directed into the barrel from the lower or discharge end and applied to the reduced size pieces as they travel along the barrel.

Spent sulphite in liquid form as used herein refers to spent sulphite liquor in liquid form as distinguished from dehydration to a powder. Spent sulphite powder as referred to herein is the powdered form of spent sulphite liquor. As described in my above-mentioned patent, spent sulphite in general refers to the complex mixture of the salts of low molecular weight of lignosulfonic acids and the alkaline hydrolysis products of pentoses and hexoses which are extracted from coniferous woods in the sulphite pulping process. The powder may also be referred to as the powdered solid form of spent sulphite liquor.

The description of the embodiment of this invention as set forth herein and illustrated in the drawings is for the purpose of setting forth the invention and explaining the principle and the mode of operation thereof and may be modified within the spirit of the invention. It is intended that the invention be limited only by the scope of the following claims.

What is claimed is:

1. Apparatus for pelletizing and treating solid material to convert it into the form of discrete particles of sufficient size so that it may be readily handled, comprising a substantially cylindrical barrel mounted for rotation about a substantially horizontal axis, means for rotating said barrel about its axis at a predetermined speed; an elongate material-working device arranged substantially in the form of a cylindrical body and provided with a helical rib on its external surface, means mounting said material-working device for rotation within said barrel about an axis parallel to the axis of said barrel, but below and to one side thereof, the external diameter of said material-working device being substantially less than the diameter of said barrel; means for rotating said material-working device about its axis in a direction such that the portion thereof most closely adjacent to the inside of said barrel moves in the same general direction and said direction being that which is generally upwardly at the side toward which the material-working device is offset from the axis of said barrel as aforesaid, but at a speed substantially greater than the speed of rotation of said barrel, so that material moving from the space where said barrel and said material-working device come into closest proximity will be moved out of this space and thrown upwardly, so that a substantial portion of the material in said barrel will be in suspension in the atmosphere therein at all times, and means for supplying spent sulphite material to the interior of said barrel to treat solid material therein and to mix therewith while it is in suspension as aforesaid.

2. Apparatus for pelletizing and treating solid material in accordance with claim 1, further comprising means for adjustably predetermining the substantially radial distance between the inside of said barrel and the outside of said material-working device adjacent thereto.

3. Apparatus for pelletizing and treating solid material in accordance with claim 1, in which said spent sulphite material is in the form of an aqueous solution, and in which said means for supplying spent sulphite liquor to the interior of said barrel comprise a supply tank for said aqueous solution, a pipe extending from said tank to the interior of said barrel, jet means in a part of said pipe within said barrel, for the spraying of said aqueous solution into said barrel, and means for forcing said solution from said supply tank through said pipe and said jet means and into said barrel as a spray.

4. Apparatus for pelletizing and treating solid material in accordance with claim 1, in which said spent sulphite material is in fine powder form, and in which said means for supplying spent sulphite material to the interior of said barrel comprises means for entraining the fine spent sulphite powder in a current of air and for forcing it into said barrel as an air-borne powder.

5. Apparatus for pelletizing and treating solid material in accordance with claim 2, in which said means for adjustably predetermining said substantially radial distance comprises a frame mounted for pivotal adjustive movement about an axis fixed with respect to the axis of said barrel, means mounting said material-working device in said frame for rotation with respect thereto about the axis of said material-working device, and means for adjustably predetermining the position of said frame about said axis about which said frame is adjustably movable as aforesaid.

References Cited in the file of this patent

UNITED STATES PATENTS

| | | |
|---|---|---|
| 1,553,539 | Kinyon | Sept. 15, 1925 |
| 2,089,061 | Herglotz | Aug. 3, 1937 |
| 2,187,601 | Glaxner | Jan. 16, 1940 |
| 2,304,382 | Shoeld | Dec. 8, 1942 |
| 2,422,989 | Skoog | June 24, 1947 |
| 2,587,309 | Giraitis | Feb. 26, 1952 |
| 2,610,115 | Lykken | Sept. 9, 1952 |
| 2,642,231 | Illig | June 16, 1953 |
| 2,674,522 | Takewell et al. | Apr. 6, 1954 |
| 2,837,415 | King et al. | June 3, 1958 |

FOREIGN PATENTS

| | | |
|---|---|---|
| 1,017,916 | France | Dec. 22, 1952 |